United States Patent
Neinavaie et al.

(10) Patent No.: US 12,517,209 B2
(45) Date of Patent: Jan. 6, 2026

(54) SYSTEMS AND METHODS FOR BLIND OPPORTUNISTIC NAVIGATION, COGNITIVE DECIPHERING OF PARTIALLY KNOWN SIGNALS OF OPPORTUNITY, AND BLIND DOPPLER ESTIMATION FROM LEO SATELLITE SIGNALS

(71) Applicant: The Regents of the University of California, Oakland, CA (US)

(72) Inventors: Mohammad Neinavaie, Irvine, CA (US); Joe Khalife, Irvine, CA (US); Zak Kassas, Columbus, OH (US)

(73) Assignee: The Regents of the University of California, Oakland, CA (US)

( * ) Notice: Subject to any disclaimer, the term of this patent is extended or adjusted under 35 U.S.C. 154(b) by 304 days.

(21) Appl. No.: 18/247,875

(22) PCT Filed: Oct. 5, 2021

(86) PCT No.: PCT/US2021/053563
§ 371 (c)(1),
(2) Date: Apr. 4, 2023

(87) PCT Pub. No.: WO2022/125173
PCT Pub. Date: Jun. 16, 2022

(65) Prior Publication Data
US 2023/0375659 A1 Nov. 23, 2023

Related U.S. Application Data

(60) Provisional application No. 63/087,591, filed on Oct. 5, 2020.

(51) Int. Cl.
*G01S 5/02* (2010.01)

(52) U.S. Cl.
CPC .......... *G01S 5/0246* (2020.05); *G01S 5/0221* (2013.01)

(58) Field of Classification Search
None
See application file for complete search history.

(56) References Cited

U.S. PATENT DOCUMENTS

| 2020/0025859 A1 | 1/2020 | Kassas et al. |
| 2021/0231787 A1* | 7/2021 | Salazar Aquino ...... G01S 13/28 |

FOREIGN PATENT DOCUMENTS

WO WO 2017/192195 A2 11/2017

OTHER PUBLICATIONS

Neinavaie, Blind Opportunistic Navigation: Cognitive Deciphering of Partially Known Signals of 2020, pp. 1-9, Internet: < https:aspin.eng.uci.edu/papers/Blind_. . . .

(Continued)

*Primary Examiner* — Whitney Moore
(74) *Attorney, Agent, or Firm* — John P. Teresinski; Stites & Harbison, PLLC

(57) ABSTRACT

Systems, device configurations, and processes are provided for blind opportunistic navigation (BON) including cognitive deciphering of partially known signals of opportunity and blind Doppler estimation from LEO satellite signal. In one embodiment a method includes receiving a signal of opportunity and using a framework for BON. In one embodiment, the framework includes performing blind Doppler estimation and tracking, performing coherent integration, and performing blind beacon detection/tracking. Coherent integration may be performed once a blind estimate of the Doppler is produced, and detecting symbols of a beacon sequence is performed for at least one of acquiring, tracking, and navigating with the received signal of opportunity. According to another embodiment, a method for blind (Continued)

Doppler estimation, includes receiving a signal of opportunity, performing an initial wipe-off operation, performing a blind residual Doppler estimation, and performing a Doppler ambiguity resolution.

20 Claims, 12 Drawing Sheets

(56) References Cited

OTHER PUBLICATIONS

International Search Report, International Application No. PCT/US21/53563, dated Jul. 5, 2022.
Written Opinions, International Application No. PCT/US21/53563, dated Jul. 5, 2022.

* cited by examiner

SYSTEMS AND METHODS FOR BLIND OPPORTUNISTIC NAVIGATION, COGNITIVE DECIPHERING OF PARTIALLY KNOWN SIGNALS OF OPPORTUNITY, AND BLIND DOPPLER ESTIMATION FROM LEO SATELLITE SIGNALS

CROSS REFERENCE TO RELATED APPLICATION

This application claims priority to U.S. provisional application No. 63/087,591 titled SYSTEMS AND METHODS FOR BLIND OPPORTUNISTIC NAVIGATION, COGNITIVE DECIPHERING OF PARTIALLY KNOWN SIGNALS OF OPPORTUNITY, AND BLIND DOPPLER ESTIMATION FROM LEO SATELLITE SIGNALS filed on Oct. 5, 2020, the content of which is expressly incorporated by reference in its entirety.

STATEMENT OF GOVERNMENT SUPPORT

This invention was made with Government support under Grant No. N00014-19-2511 awarded by the Office of Naval Research and Grant No. 1929965 awarded by the National Science Foundation (NSF). The Government has certain rights in the invention.

FIELD

The present disclosure generally relates generally to navigation using signals of opportunity and more particularly to blind opportunistic navigation, including cognitive deciphering of partially known signals of opportunity and blind Doppler estimation from LEO Satellite Signals.

BACKGROUND

Signals of opportunity (SOPs), including AM/FM radio signals, Wi-Fi, and cellular have been recently adopted as alternative navigation sources in global navigation satellite system (GNSS)-challenged environments. Low Earth Orbit (LEO) satellites signals may be of interest as thousands of broadband Internet satellites are expected to be launched. Adapting existing protocols to support navigation capabilities comes at a significant cost.

One of the main challenges of opportunistic navigation via SOPs of private broadband systems, e.g. LEO broadband satellites, is that the signal specifications of these SOPs may not be available to the public. As such, acquiring and tracking of some of these satellite signals is impossible for a regular opportunistic receiver. There exists a desire and a need for receivers that can blindly acquire unknown signals for opportunistic navigation.

BRIEF SUMMARY OF THE EMBODIMENTS

Disclosed herein are systems, methods and configurations for blind opportunistic navigation (BON). In one embodiment, a method for blind opportunistic navigation includes receiving, by a device, at least one signal of opportunity, and performing, by the device, at least one operation to estimate a Doppler frequency of the at least one signal. The method also includes performing, by the device, at least one operation for coherent integration of the at least one signal using the estimate of Doppler frequency, wherein coherent integration estimates at least one beacon sequence of the at least one signal. The method also includes detecting, by the device, at least one symbol of a beacon sequence of the at least one signal, and controlling, by the device, navigation using the at least one beacon sequence.

In one embodiment, receiving at least one signal of opportunity includes receiving multiple signals in a bandwidth of interest, and wherein the at least one signal includes a synchronization beacon for receiver timing and carrier recovery.

In one embodiment, estimating Doppler frequency includes performing one or more operations to detect joint signal activity and to classify modulation of the at least one signal, wipe-off the data symbols from the at least one signal, and to determine a frequency of the at least one signal.

In one embodiment, estimating Doppler frequency includes tracking Doppler frequency of a plurality of signals of opportunity and detecting symbols of a beacon sequence for the plurality of signals of opportunity.

In one embodiment, Doppler frequency, modulation type, and length and symbols of a beacon signal of the at least one signal are unknown to the device, and wherein coherent integration includes integrating successive transmissions of a beacon signal using estimates of Doppler frequency and code phase to track the at least one signal of opportunity.

In one embodiment, coherent integration is performed to detect symbols of a beacon sequence of the at least one signal of opportunity, including determining presence of a beacon signal and tracking Doppler frequency of multiple signals of opportunity to determine the beacon sequence.

In one embodiment, coherent integration is performed for a number of complete cycles of beacon and synchronization signals to accumulate energy and to compensate for the low signal to noise ratios.

In one embodiment, detecting at least one symbol of a beacon sequence by correlating successive frames to determine occurrence of a transition, sampled using a chirp rare and processing accumulated frames using a tree based algorithm.

In one embodiment, controlling navigation includes determining a code phase estimate in meters as a pseudorange estimate of device position.

In one embodiment, controlling navigation includes stacking measurement vectors for sources of the at least one signal of opportunity to determine position of the device relative to source of the signal of opportunity.

Another embodiment, is directed to a device configured for blind opportunistic navigation. The device includes a receiver configured to receive at least one signal of opportunity, and a controller. The controller is configured to perform at least one operation to estimate a Doppler frequency of the at least one signal. The controller is also configured to perform at least one operation for coherent integration of the at least one signal using the estimate of Doppler frequency, wherein coherent integration estimates at least one beacon sequence of the at least one signal. The controller is also configured to detect at least one symbol of a beacon sequence of the at least one signal, and control navigation using the at least one beacon sequence.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
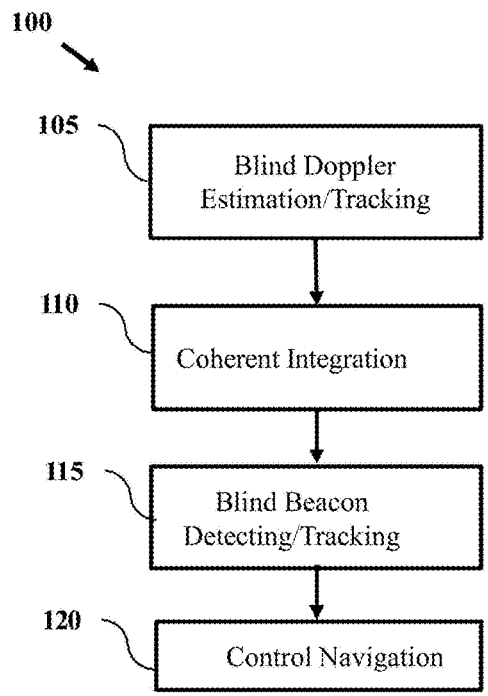
FIG. 1 illustrates a process for blind opportunistic navigation according to one or more embodiments.

One aspect of this disclosure is directed to blind opportunistic navigation. Systems, device configurations and methods are provided for cognitive deciphering of partially known signals of opportunity (SOP) according to one or more embodiments. The abundance of signals of opportunity (SOP) in low Earth orbit (LEO) and terrestrial broadband communication systems may be a reliable alternative to global navigation satellite system (GNSS) in challenging environments. However, some specifications of the ambient SOPs may not be available to the public. The lack of crucial information on beacon signals make navigation with SOPs very challenging.

According to one embodiment, a framework is provided for blind opportunistic navigation (BON) to enable the acquisition and tracking of SOPs with unknown specifications. Embodiments are also directed to low complexity algorithms to blindly detect beacon signals and estimate the Doppler. These features may relate to the building blocks of a BON system according to one embodiment. Using a BON framework as described herein, one result may be simultaneous deciphering of GPS satellites (e.g., 4 GPS satellites). Experimental results are included to demonstrate an average of 96% correct chip detection performance for the four deciphered GPS satellites.

Device configurations and methods are provided for acquiring and tracking satellite signals (e.g., LEO signals), which is not possible for a regular opportunistic receiver, using a blind opportunistic navigation (BON) framework. Assuming that the SOP follows a standard modulation, e.g. code-division multiple access (CDMA) or orthogonal frequency-division multiplexing (OFDM), a BON receiver can recover, and/or decode, an unknown signal structure to provide a navigation solution in the absence of GNSS signals according to embodiments. Most communication systems employ a synchronization beacon for receiver timing and carrier recovery. For example, in cellular CDMA, pseudorandom noise (PN) sequences are used on the forward-link pilot channel for synchronization proposes. Other examples of such beacons are the primary synchronization signal (PSS) and secondary synchronization signal (SSS) in cellular LTE systems. Even though different broadband services may use the same modulation schemes, their underlying configuration and parameters can be different. For instance, the Globastar satellite system supposedly uses a similar protocol to the IS-95 cellular CDMA system but with different PN sequences. According to embodiments, a crucial stage in the architecture of a BON receiver may be to blindly detect the unknown PN sequence of the SOP in an online fashion or in a pre-navigation training stage.

Approaches that rely on coherently integrating samples of the transmitted signals to discover unknown signal characteristics do not account for the time-varying Doppler shifts and delays, which make it impossible to accumulate enough signal power to detect the PN sequence. According to one embodiment, a BON receiver is configured for flexibility in cognitively detecting an unknown PN sequence of any broadband signal transmitter which uses a particular communication standard, e.g. CDMA. Therefore, unlike a process that concentrates on deciphering one particular system, a BON receiver as described herein can cognitively decipher partially known SOPs by deploying a detection algorithm with a reasonable computational complexity and detection performance.

According to one embodiment, cognitively deciphering partially known SOPs may be performed by joint detection and estimation of unknown characteristics of SOPs for navigation purposes. Embodiments include providing a framework and concept of a BON system to design receivers to blindly acquire and track signals of opportunity with partially known characteristics. Embodiments also provide algorithms and processes for blind beacon signal detection and blind Doppler estimation. Using frameworks according to one or more embodiments, GPS signals may be deciphered, PRNs of GPS satellites may be blindly detected, and a navigation solution with BON receiver may be provided.

Another aspect of the disclosure is directed to processes and device configurations for a computationally-efficient algorithm for blind Doppler frequency estimation from orthogonal frequency division multiplexing (OFDM) signals transmitted by low Earth orbit (LEO) satellites. According to one embodiment, a method is provided for resolving ambiguity in the resulting Doppler estimates. Experimental results are presented demonstrating blind Doppler estimation from real fifth-generation (5G) New Radio (NR) signals for over 700 seconds on a moving ground vehicle.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As used herein, the term "pseudorange" refers to values calculated by a receiver representing the time a signal has taken to travel from a satellite to a receiver. Pseudorange is modeled as the true range between the satellite and receiver plus the speed of light times the difference of the receiver's and satellite's clock biases.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

EXEMPLARY EMBODIMENTS

FIG. 1 illustrates a process for a blind opportunistic navigation (BON) according to one or more embodiments. According to one embodiment, a BON framework may be incorporated and/or performed as a process by a receiver device to utilize one or more SOPs. One or more system configurations as described herein may also utility process 100.

According to one embodiment, a BON framework may be configured to cognitively decipher, acquire, and track SOPs that may be partially known. Cognitive deciphering in the BON receiver refers to blindly detecting and tracking of beacon signals, which in turn allows for received signals to be used for positioning and navigation purposes. According to one embodiment, beacon signal detection requires estimating a number of unknown parameters from observations and partially known information about the SOP. In certain scenarios, it may be reasonable to assume that only the bandwidth of the transmitted signal is known to the receiver. However, the Doppler frequency, the modulation type, and the length and symbols of the beacon signal may be unknown. Modulation classification and unknown signal length estimation have been investigated. According to one or more embodiments described herein, it may be assumed without loss of generality that the length of the beacon signal is given. Moreover, assuming the very likely scenario that the beacon signal symbols are drawn from an arbitrary MPSK constellation, embodiments provide a method for estimating the order of the modulation type, i.e., M.

According to one or more embodiments, a beacon or pilot signal is a signal known by the receiver and is used for timing and carrier synchronization, e.g., the PN sequence in 3G CDMA 2000 systems or the CP, SSS, or PSS in 4G LTE and 5G NR systems. Correlation receivers are typically used to detect the presence of beacon or pilot signals and synchronize to them. Due to the properties of correlation receivers, the known beacon or pilot signals can still be detected reliably even at relatively low signal-to-noise ratios (SNRs). However, the beacon is unknown to a BON receiver and the signal's SNR is typically too low for reliable blind detection. Consequently, coherent integration becomes crucial to increase the effective SNR of the received beacon signal. To be able to coherently integrate successive transmissions of the beacon signal, the Doppler shift (or Doppler frequency) must be estimated. Even after increasing the effective SNR via coherent integration, a naive symbol-by-symbol detection approach of the beacon signal may fail. As such, a high-performance detection algorithm as discussed herein is needed to reliably estimate the beacon signal after coherent integration.

In FIG. 1, process 100 illustrates operations that may embody building blocks of a BON framework. According to one embodiment, process 100 includes operations of a BON framework including performing (i) blind Doppler estimation/tracking at block 105, (ii) coherent integration at block 110 and (iii) blind beacon detection/tracking block 115. Once a blind estimate of the Doppler is produced, coherent integration may be performed and the integrated signal can be fed to a detection algorithm to detect and estimate the symbols of the beacon sequence. The detected beacon sequence may then used by an SOP navigation receiver to acquire, track, and navigate with the received SOP. Process 100 includes controlling navigation at block 120.

Process 100 may operate as a blind opportunistic navigation (BON) in that parameters of signals of opportunity are unknown to the receiver. Process 100 includes receiving, by a device, at least one signal of opportunity, and performing, by the device, at least one operation to estimate a Doppler frequency of the at least one signal at block 105. Multiple signals in a bandwidth of interest may be detected at block 105. Each of the signals can include a synchronization beacon for receiver timing and carrier recovery. Using operations described herein a device may detect and track elements of the signals, such as a synchronization beacon. Transmitted communication data of the signal may be wiped during processing.

At block 110, process 100 includes performing at least one operation for coherent integration of the at least one signal using the estimate of Doppler frequency. According to embodiments, coherent integration estimates at least one beacon sequence of the at least one signal. In order to estimate Doppler frequency, process 100 may include performing one or more operations to detect joint signal activity and to classify modulation of the at least one signal, wipe-off the data symbols from the at least one signal, and to determine a frequency of the at least one signal. As discussed below, estimates of the Doppler frequency and carrier phase may be used to detect beacon symbols. Doppler frequency, modulation type, and length and symbols of a beacon signal of the at least one signal may be unknown to the device. As such, coherent integration can include integrating successive transmissions of a beacon signal using estimates of Doppler frequency and code phase to track the at least one signal of opportunity. According to embodiments, coherent integration is performed to detect symbols of a beacon sequence of the at least one signal of opportunity, including determining presence of a beacon signal and tracking Doppler frequency of multiple signals of opportunity to determine the beacon sequence. According to other embodiments, coherent integration is performed for a number of complete cycles of beacon and synchronization signals to accumulate energy and to compensate for the low signal to noise ratios.

At block 115, process 100 includes detecting at least one symbol of a beacon sequence of the at least one signal. Detecting at least one symbol of a beacon sequence by correlating successive frames to determine occurrence of a transition, sampled using a chirp rare and processing accumulated frames using a tree based algorithm.

At block 120, process 100 includes controlling navigation using the at least one beacon sequence. Controlling navigation can include determining a code phase estimate in meters as a pseudorange estimate of device position. According to embodiments, controlling navigation includes stacking measurement vectors for sources of the at least one signal of opportunity to determine position of the device relative to source of the signal of opportunity.

According to one embodiment, process 100 may be performed by a device, such as a receiver. Process 100 may operate using one or more frameworks and devices described herein.

Receiver Baseband Signal Model

Let s(t) denote the beacon signal consisting of N consecutive symbols with symbol duration $T_{symb}$. Each symbol is drawn from an arbitrary MPSK constellation. The beacon signal is continuously transmitted at a period of $N \cdot T_{symb}$. After channel propagation and baseband sampling at interval $T_s$, the received signal can be modeled as $$y[n] = \sum_{i=-\infty}^{\infty} \alpha d_i \exp[j(2\pi \Delta f[n]n + \theta_0)]s[n - iL - n_d[n]] + w[n],$$

where $y[n]$ is the complex baseband sample at the nth time slot;

$$L = N \frac{Tsymb}{Ts}$$

is the length of the beacon in samples; $\Delta f[n] \triangleq f_D[n]T_s$ is the normalized Doppler frequency and $f_D[n]$ is the true Doppler frequency in hertz; $\theta_0$ is the initial beat carrier phase; $w[n]$ models noise and interference; $\alpha$ is an unknown complex amplitude; $d_i$ is a low rate data symbol drawn from the same constellation of the beacon signal, e.g. navigation bits in GPS signals; and $n_d$ is the unknown delay of the received beacon signal which can be modeled as $$n_d[n] = \left\lfloor \frac{t_d[n]}{T_s} \right\rfloor, t_d[n] \triangleq t_{d_0} - \frac{\Delta f_D[n]}{f_c} n,$$

where $t_{d0}$ is the initial delay in seconds of the received beacon signal and $f_c$ is the carrier frequency.

It is worth noting that the signal model in above may be descriptive of the majority of cognitive opportunistic navigation scenarios. Along with cases that directly apply, in some scenarios, such as the CDMA based communication systems, the existence of several logical channels that are multiplexed on the same physical channel, the presence of interference should also be taken into account. For example, there is a total of 128 logical channels multiplexed onto the CDMA2000 physical forward channel: (i) one pilot channel, (ii) one sync channel, (iii) up to seven paging channels, and (iv) traffic on the remaining channels. Each of these logical channels is spread orthogonally by a 128-Walsh code, multiplexed with the rest of the channels, and the resulting signal is multiplied by a complex PN sequence which consists of a pair of maximal-length sequences. The CDMA signal is then filtered to limit its bandwidth before transmission. In such a system, and CDMA systems in general, the signal on the pilot channel simplifies to the complex PN sequence, which is the beacon of interest. Therefore, according to embodiments, one can look at the CDMA signal as the sum of (i) the signal on the pilot channel, or the beacon signal, and (ii) the sum of the remaining channels. Due to the properties of Walsh codes and assuming the symbols on the sync, paging, and traffic channels are uncorrelated, one can model the aforementioned second term as noise. In fact, for a large number of logical channels such as in CDMA2000, the central limit theorem practically applies and the resulting noise can be modeled as a zero-mean Gaussian random variable with a determined variance. Consequently, the CDMA signal can be modeled according to the model above, where $s[n]$ is the beacon on the pilot channel, and $w[n]$ captures channel noise and the effect of the rest of the logical channels.

Bon Receiver

Figure 2:
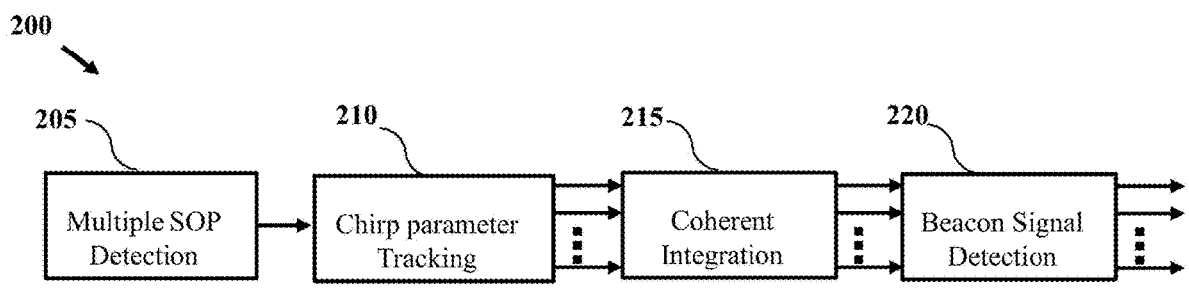
FIG. 2 illustrates a blind opportunistic navigation (BON) framework according to one or more embodiments.

FIG. 2 illustrates a blind opportunistic navigation (BON) framework according to one or more embodiments. According to one embodiment, the core of a BON receiver can include operations for: (i) detection of multiple SOPs at block 205, (ii) chirp parameter tracking at block 210, (iii) coherent accumulation at block 215, and (iv) beacon signal detection at block 220.

One or more embodiments are focused on blind Doppler estimation and beacon signal detection steps. However, properly designed algorithms for signal activity detection of multiple SOPs in the bandwidth of interest and the coherent integration of the observations may be essential steps to cognitively decipher the SOPs. It should be also be pointed out that signal activity detection of multiple SOPs may also include an additional modulation classification step to identify the modulation type of the beacon signals of the corresponding SOPs. Spectrum sensing techniques in cognitive radio systems, e.g., the energy detector, and blind modulation classification methods can be employed to detect the presence of SOPs and classify the modulation type of their beacon signal. In a BON receiver according to embodiments, a heuristic algorithm may be employed for joint signal activity detection and modulation classification. The algorithm performs a nonlinear operation to wipe-off the data symbols and turn the received signal into a pure tone. Then, the FFT of a large enough CPI is taken to detect the location of the tone in the spectrum. For instance, for MPSK modulated data, taking the power of M of the received signal wipes off the data symbols. Repeating this operation for different values of M and calculating the maximum peak of the absolute value of the FFT can help us determine whether an MPSK-modulated beacon signal is active in the observations or not. Once the presence of an MPSK beacon is detected using the aforementioned algorithm, we track the Doppler frequency of multiple SOPs and detect the symbols of the beacon sequence using the methods discussed in the following subsections.

Figure 3:
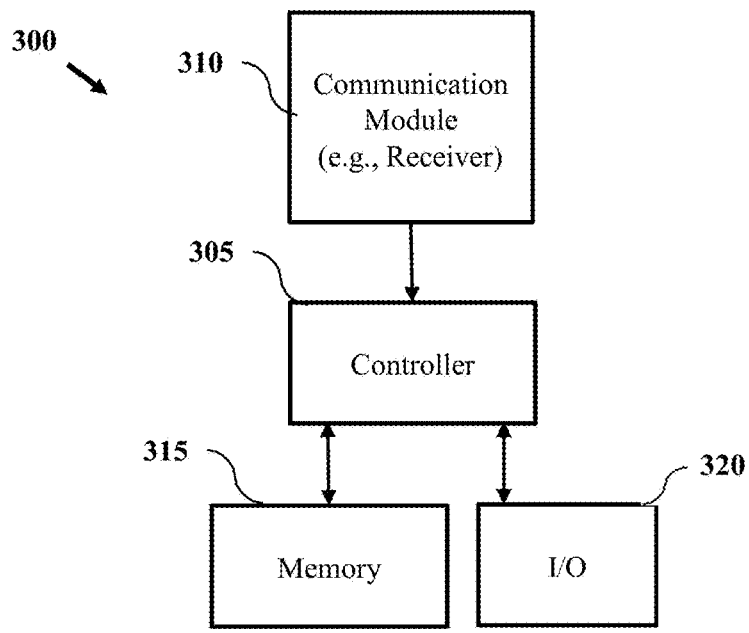
FIG. 3 depicts a device configuration according to one or more embodiments.

FIG. 3 depicts a device configuration according to one or more embodiments. FIG. 3 illustrates a device configuration for BON receiver. According to one embodiment, device 300 may include controller 305, communications module 310, memory 315, and input/output (I/O) unit 320.

Controller 305 may relate to a processor or control device configured to execute one or more operations stored in memory 315, such as a BON receiver framework. Controller 305 may be coupled to memory 315, I/O 320 and communication module 310. Communications module 310 may be configured to receive one or more communication signals and/or SOPs.

Controller 305 may be configured to process received signals based on frameworks discussed herein including for Blind Doppler Estimation. According to embodiments, controller 305 may be configured to configured to perform at least one operation to estimate a Doppler frequency of the at least one signal. Controller 305 may be configured to perform at least one operation for coherent integration of the at least one signal using the estimate of Doppler frequency, wherein coherent integration estimates at least one beacon sequence of the at least one signal. Controller 305 may also be configured to detect at least one symbol of a beacon sequence of the at least one signal, and control navigation using the at least one beacon sequence.

Blind Doppler Estimation

Coherent Processing Interval for Doppler Estimation

As mentioned previously, blind Doppler estimation is one of the main challenges that has to be addressed in the BON framework. Due to the low SNR, any estimation/detection algorithm has to account for time, and perform integration to be able to exploit information from the received signal in a blind fashion. The low effective SNR per degree of freedom in many scenarios, e.g., spread spectrum, may impose a large coherent processing interval (CPI). The blind Doppler estimator in the BON receiver processes one CPI at once to estimate the Doppler parameters corresponding to the CPI. Denoting the length of the kth CPI by I, we can rewrite the observations corresponding to the kth CPI as $$y^k \triangleq [y[kI]y[kI+1], \ldots, y[(k+1)I-1]]^T.$$

To accumulate enough energy, I has to be large enough to include a sufficient number of complete cycles of the beacon signal. Therefore, considering I=ψL, where ψ is determined experimentally based on the effective SNR. For systems that operate at a low SNR regime ψ should be chosen be large enough to accumulate energy and compensate for the low SNR. The low rate data symbols di can be estimated and wiped-off using some correlation techniques that will be described later. Therefore, assuming a constant Doppler frequency $\Delta f[n]=\Delta f$, the signal part of the observation includes a periodic beacon with of length L and its Fourier transform can be written as an impulse train with period $$f_0 = \frac{1}{L}.$$

More precisely, $$\mathcal{F}\left\{\sum_{i=-\infty}^{\infty} \alpha \exp(j2\pi\Delta fn)s[n-iL-n_d]\right\} = \sum_{i=-\infty}^{\infty} \alpha S(if_0)\delta(f-\Delta if_0),$$

where $S(f)=\mathcal{F}\{s(t)\}$ is the Fourier transform of s(t). As such, a proper sliding band-pass filter, is capable of tracking the Doppler frequency changes in different CPIs from S(f). Tracking the impulse trains results in an ambiguity of an integer multiple of $f_0$ in the Doppler estimate. Using a nonlinear operation, such as raising the received signal to the power of M, we can remove the beacon sequence symbols s[n] as well as the low-rate data symbols dis from the observation vector. Ideally, the resulting signal after removing the beacon and data symbols becomes a pure tone, from which the Doppler frequency can be directly tracked without ambiguity. However, it is important to note that this method may fail in low SNR applications, as raising the signal to the power of M may result in extreme noise amplification.

The fast time-varying nature of the Doppler frequency in many scenarios, e.g., LEO satellites, should also be taken into account in the BON receiver. The Doppler frequency may vary considerably during large enough CPIs. In such cases, standard frequency estimators such as the FFT estimator will not capture the entire dynamics of the time-varying Doppler frequency. Assuming the Doppler frequency can be modeled as a time polynomial of order p, it can be shown that the FFT estimator will yield an estimation error that is a time polynomial of order p-1. Therefore, the magnitude of the estimation error may grow unacceptably large in the FFT estimator. In many practical scenarios, the instantaneous Doppler frequency can indeed be modeled as a time polynomial during one CPI; therefore, a more sophisticated estimator must be employed. Signals whose frequencies increase or decrease as a time polynomial are referred to as chirp signals. A linear chirp can be written as $$c(t)=\exp(j2\pi(\beta t+\gamma)t),$$

where β and γ are the parameters of the linear chirp signal. In order for a BON receiver to have a reliable track of the instantaneous Doppler frequency, the estimation of the chirp parameters have to be taken into account.

Wigner Distribution and the Chirp Parameter Estimation

One classic way of estimating the parameters of a chirp is through the Wigner distribution, which for a single chirp signal c(t) is given by $$W(t,f) = \int_{-\infty}^{\infty} c\left(t+\frac{\tau}{2}\right)c^*\left(t-\frac{\tau}{2}\right)\exp(-j2\pi f\tau)d\tau.$$

For a linear chirp, i.e., $$c(t)=\exp(j2\pi(\beta t^2+\gamma t)),$$

we have $$W(t,f)=\delta(f-(2\beta t+\gamma)).$$

The Wigner distribution concentrates the energy on the time history of the instantaneous frequency and can be used to estimate the parameters of a chirp. The sampled linear chirp c (t) at the nth time instant of the kth CPI, i.e., $(kI+n)T_s$, is $$c((kI+n)T_s) = \xi \exp\left(j2\pi\frac{m_k}{2}n^2\right)\exp j2\pi\Delta f_k nT_s$$

where $$\Delta f_k = 2ki\Delta\beta_k T_s + \gamma_k, \quad T_s^2\beta_k \triangleq \frac{m_k}{2}$$

and ξ is a complex number with a constant phase. Direct implementation of the relationship above may be computationally inefficient, as the complexity grows with $I^3 \log I$. Alternatively, one can search over certain values of m, wipe-off the effect of m, and take the FFT of the wiped-off signal to estimate γ. This reduces the overall computational complexity of chirp parameter estimation dramatically. The proposed low computational complexity algorithm for chirp parameters estimation is summarized in Algorithm 1, shown as 400 for FIG. 4. According to embodiments, chirp parameter estimation may be performed by a device performing operations for input 401 to generate output 402. Values of m, are characterized and employed to wipe of certain values of m and to calculate the Doppler frequency shown as 403. Algorithm 400 can also be employed to calculate parameters each chirp shown as 404.

Coherent Integration

According to embodiments, coherent integration may include one or more operations to utilize frames of a received signal, wherein operations on the frames estimate a beacon signal within the received signal. Coherent integration may accumulate frames of the received signal to generate an observation vector. According to embodiments, given a Doppler frequency estimate $\Delta f$, an estimate of the beacon signal delay $\hat{n}_d$ can be formed; subsequently, the effect of the Doppler frequency can be wiped-off as $$\hat{y}_{m'}[l]=y[l+m'L]\exp[-j(2\pi\Delta f[1+m'M](1+m'M))]\otimes\delta[l-\hat{n}_d[l+m'M]],$$

where $$n_0 \triangleq \left\lfloor \frac{t_{d_0}}{T_s} \right\rfloor$$

is the initial beacon signal delay, and $\otimes$ denotes the circular convolution. Subsequently, $M'$ frames of the resulting signal are accumulated to form an estimate of the low rate data, where $$\bar{y}[l] = \frac{1}{M'}\left(\hat{y}_0[l] + \sum_{m'=1}^{M'-1} \hat{d}_{m'} \hat{y}_{m'}[l]\right) \approx \alpha' s[l - n_0] + w'[l],$$

where $\alpha'$ is a constant complex amplitude capturing the channel effect, initial beat carrier phase, and the residual Doppler; $\hat{d}_m = \Pi_{r=1}^{m} \bar{d}_r$ is the estimate of the low rate data where $$\bar{d}_r = \text{sgn}\left\{\text{Re}\left(\sum_{l=0}^{L-1} \tilde{y}_r[l]\tilde{y}_{r-1}[l]^*\right)\right\}$$

and $w'[l]$ captures the resulting noise. Note that the signal part of the right-hand side of low rate data estimate equation is a shifted version of the beacon signal with a complex scaling. The vector $z=[\tilde{y}[[0], \ldots \tilde{y}[L-1]]$ is then fed to the beacon detection algorithm to decipher the beacon signal.

Blind Beacon Detection

After wiping-off the Doppler and performing coherent integration, we denote the resulting coherently integrated observation vector by z. It should be noted that the length of the vector z is equal to the length of the beacon signal, i.e. L. We can reformulate the system model as $$z = \alpha s + w,$$

where $\alpha$ is the unknown complex amplitude of the received signal and is considered to be constant in the CPI, w is the resulting noise. Also, consider the set L consisting all $M^L$ vector combinations whose elements are the integers between 0 to M−1. For MPSK, a beacon sequence is $$s = \exp\left(\frac{j2\pi}{M} q\right)$$

where $q \in L$. The problem of non-coherent blind detection of q is addressed in the following subsection.

Beacon Search Algorithm

One can show that the non-coherent maximum likelihood ($M^L$) detector of q is $$\hat{q} = \underset{q \in \mathcal{L}}{\text{argmax}} \left| z^H \exp\left(\frac{j2\pi}{M} q\right) \right|,$$

where $(\cdot)^*$ and $(\cdot)^H$ are the complex conjugate and Hermitian operators, respectively.

A solution to the optimization problem includes an exponential brute-force search over all possible values of q. The order of the brute-force search is MK. In an effort to solve in less than quadratic complexity, a communications theory technique may be employed.

In order to calculate the number of search candidates, first the coherent detector of q for a given phase is rewritten to complex amplitude $\alpha$. Note that the coherent detector does not depend on the magnitude of $\alpha$, but only depends on its phase $\varphi$. More precisely, for a given value of $\varphi$, we have $$q_\phi = \underset{q}{\text{argmax}}\, \Re\left\{\exp(-j\phi) z^H \exp\left(\frac{j2\pi}{M} q\right)\right\}.$$

Due to the nature of i.i.d noise and the independence of the elements of sk, the coherent detector simplifies to a symbol by symbol MPSK detector for a given $\varphi$. Hence, the kth element of q- is obtained by mapping the phase of the kth element of $\exp(j\varphi)z$ to the closest multiple of $$\frac{2\pi}{M}$$

i.e., $$q_\phi[k] = \text{round}\left[(\phi_k + \phi)\frac{M}{2\pi}\right] \bmod M,$$

where mod is the modulus operator and $\phi_k \triangleq \arg\{z[k]\}$. Thus, we can find the optimal q by searching over all possible values for $\varphi$. However, it can be readily shown that $$q_\phi \text{ and } q_{\phi + \frac{2\pi}{M}}$$

result in the same likelihood function. Consequently, the search space for $\varphi$ is limited to the interval $$\left[0, \frac{2\pi}{M}\right).$$

Since $\varphi$ is limited to the interval $$\left[0, \frac{2\pi}{M}\right)$$

a detected MPSK symbol will have an ambiguity of 2 instead of M. That is, a particular $\phi_k[k]$ can take one of two values, based on which symbol in the MPSK constellation is closest to it. Define $$c_1 \triangleq q_{\phi=0} \text{ and } c_2 \triangleq q_{\phi=\frac{2\pi}{M}},$$

where it can be shown that $c_2[k]=(c_1[k]+1) \bmod M$. It can also be shown that the boundary angle between two symbols in the MPSK constellation is given by $$\gamma_k \triangleq \frac{2\pi}{M_l} c_1[k] + \frac{\pi}{M} - \phi_k.$$

Subsequently, each candidate MPSK symbol will be given by $$q_\phi[k] = \begin{cases} c_1[k] & \phi \leq \gamma_k, \\ c_2[k] & \phi > \gamma_k \end{cases}.$$

For convenience of notation, we sort the values of $\gamma k$ in an ascending order with a new index k' such that $\gamma k'+1 > \gamma k'$. Therefore, the first boundary angle is $\gamma 1'$. Consequently, each candidate is of the form $$[q_{\phi=0}[1]+1-u(\gamma_1'-\phi), \ldots, q_{\phi=0}[L]+1-u(\gamma_L'-\phi))]^T$$

where $u(\cdot)$ is the unit step function. For different values of $\varphi$ we have L different candidates $A=\{a_1, \ldots, a_L\}$. Each candidate can be used to obtain an optimal $\hat{q}$. Finally, by searching over Doppler we get the total number of L search candidates. Consequently, in order to find the candidate effectively we can solve $$\hat{q} = \underset{q \in \mathcal{A}}{\operatorname{argmax}} \left| (y^k)^H \exp\left(\frac{j2\pi}{M}q\right) \right|,$$

where card $(A)=L$ and card$(A)$ is the carnality of the set A. By plugging the consecutive candidates aj the following recursive formula that can be used $$z^H \exp\left(\frac{j2\pi}{M}a_l\right) = z^H \exp\left(\frac{j2\pi}{M}a_{l-1}\right) + z[l] * \exp\left(\frac{j2\pi}{M}a_l[l]\right)\left(\exp\left(\frac{j2\pi}{M}-1\right)\right).$$

The equation above demonstrates the recursion between the likelihood functions corresponding to each candidate. It can be seen form that the lth likelihood only depends on the lth observation and the previous likelihood. Therefore, a tree based algorithm based on the equation above can be deployed to optimally detect the beacon sequence with a computational complexity of order L.

In order to demonstrate the capability of the BON receiver in cognitively deciphering a source of interest, experimental results are provided with real GPS signals. GPS signals consist of pseudorandom noise (PRN) beacons with 1.023 msps chipping rate, modulated by binary PSK (M=2) navigation bits at 50 bps. Multiple GPS satellites can transmit simultaneously in the same channel using CDMA. In what follows, the experimental setup is first described. Next, GPS PRNs are detected using the BON receiver. The detected PRNs are used to produce pseudorange measurements on GPS satellites and in turn solve for a stationary receiver's position.

Figure 9:
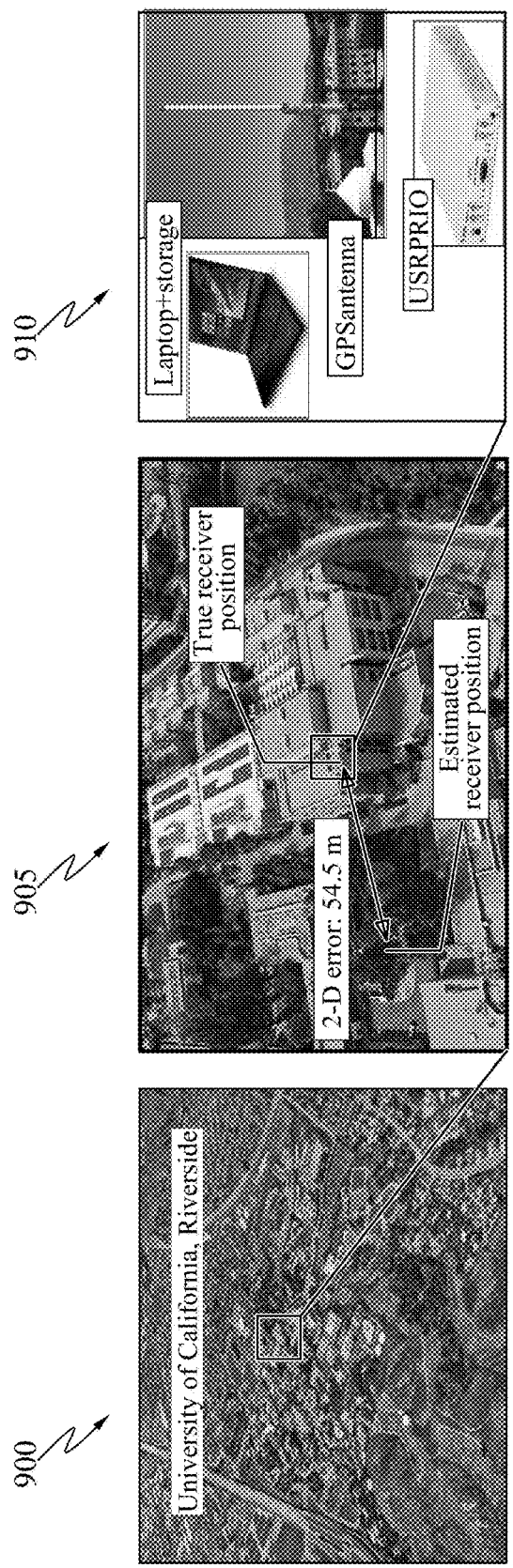
FIG. 9 illustrates an experimental setup.

An experimental setup 910 included a GPS antenna mounted on the roof of the Winston Chung Hall at the University of California, Riverside, shown as 900. The GPS signals were down-mixed and sampled via a National Instruments universal software radio peripheral (USRP) RIO, driven by a GPS-disciplined oscillator (GPSDO). The samples of the received signals were stored for off-line post-processing. The hardware setup is shown in FIG. 9. True receiver position and estimated receiver position are illustrated as 905 in FIG. 9

Deciphering GPS PRNs with the BON Receiver
Multiple SOP Detection

As mentioned previously, we propose a heuristic method to detect and localize multiple SOPs in frequency domain. In order to detect and classify multiple SOPs embodiments include raising observation to the power of M to wipe off the PRNs and the low rate data symbols and detect the resulting pure tone. Since GPS satellites transmit BPSK signals, when the received signal is raised to the power M=2 the data is wiped off and results in complex exponentials with twice the Doppler frequencies. This allows the BON receiver to detect several satellites that transmit in the same channel, and multiple peaks will be seen in the Fourier transform of the data-less signal, as shown in FIG. 5.

Figure 5:
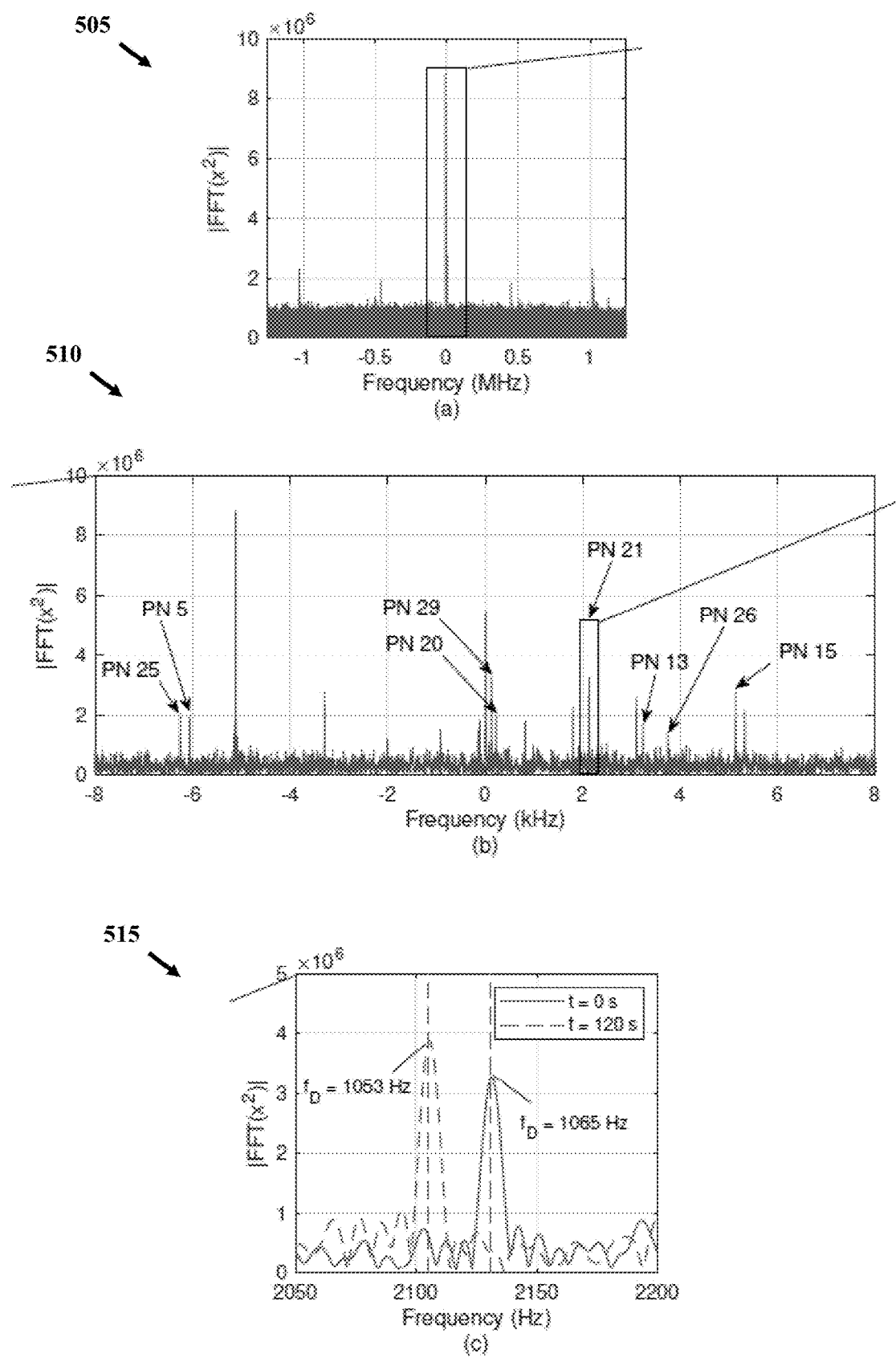
FIG. 5 illustrates joint signal activity detection and modulation classification of the beacon signals.

FIG. 5 illustrates joint signal activity detection and modulation classification of the beacon signals shown as 505: Recall that the frequency component of power of two will be double that of the original signal. (b) Multiple satellite detection shown as 510: FFT peaks corresponding to different GPS satellites. (c) FFT peaks of PRN 21 at t=0 s and t=120 s shown as 515.

Chirp Parameter Tracking

Figure 4:
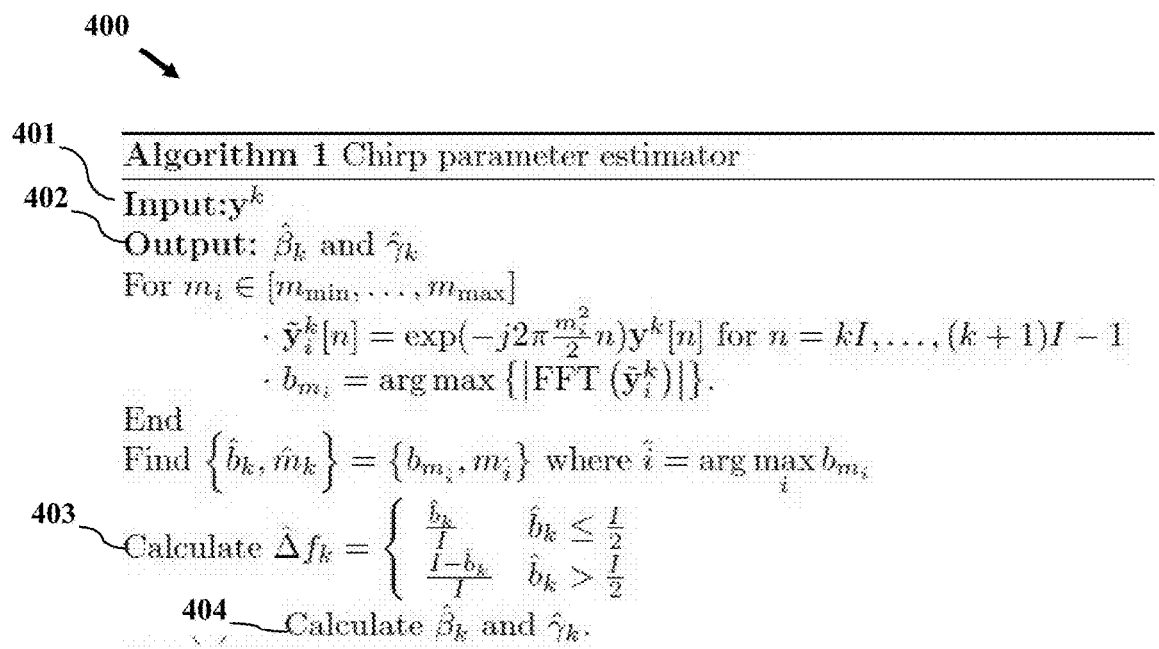
FIG. 4 illustrates an algorithm according to one or more embodiments.
Figure 6:
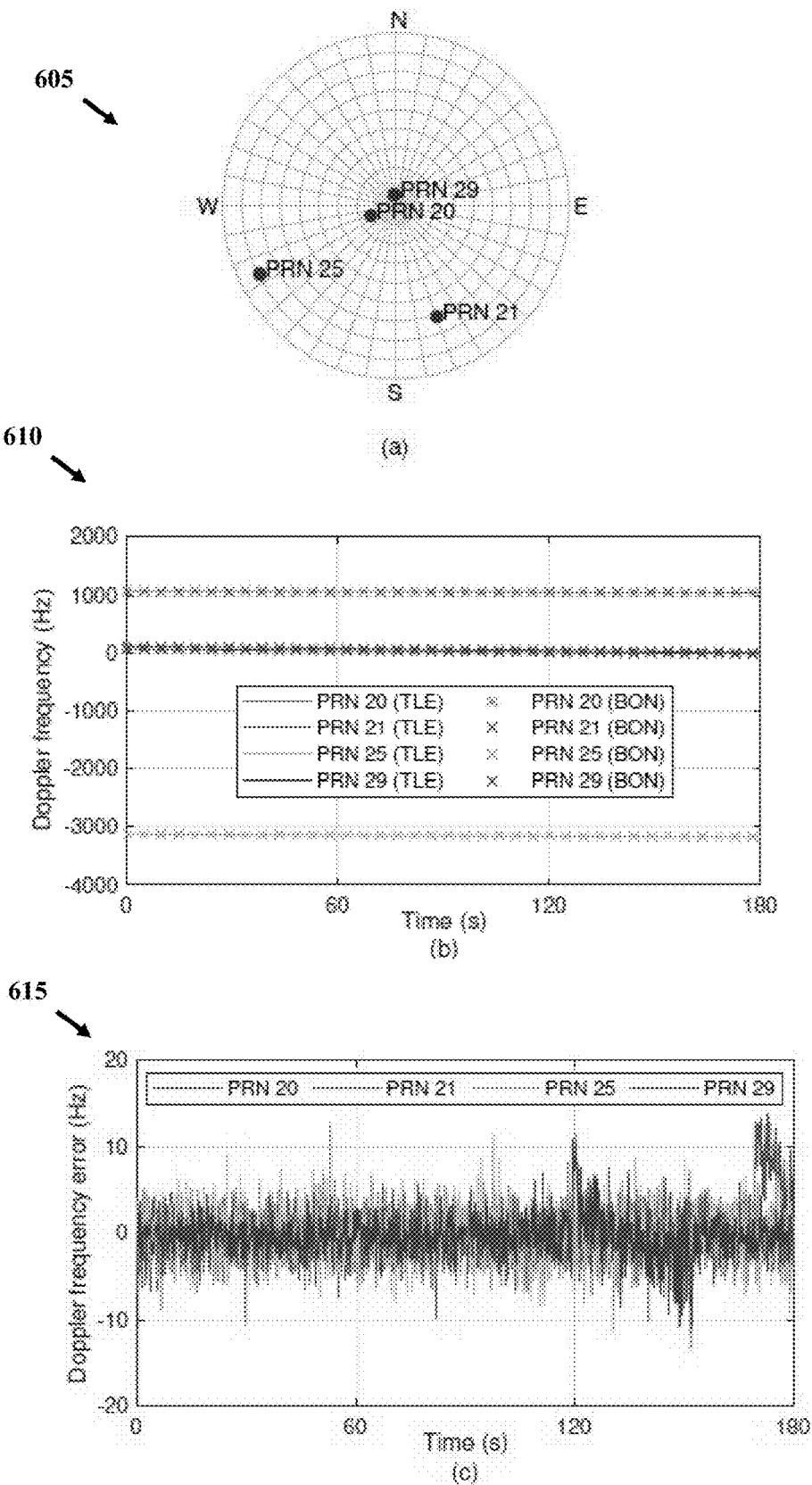
FIG. 6 illustrates a skyplot and estimated Doppler frequencies.

Next, using Algorithm 1 of FIG. 4, the peaks shown in FIG. 5 are tracked over time, producing Doppler frequency estimates to each satellite, as shown in FIG. 6 The CPI is considered to be I=120L, i.e. $\psi$=120. As it can be seen in FIG. 6, the blind chirp parameter estimator successfully tracks the Doppler frequency of multiple SOPs producing negligible residual in comparison with the TLEs.

FIG. 6 illustrates (a) Skyplot 605 of 4 of the visible GPS satellites. (b) Time history 610 of (i) the Doppler frequency of 4 of the GPS satellites obtained from the TLE and SGP4 orbit determination software and (ii) the estimated Doppler frequencies of the corresponding satellites using the BON receiver. (c) Errors 615 between the Doppler frequencies obtained from the TLE and the ones obtained using the BON receiver.

Beacon Signal Detection

Figure 7:
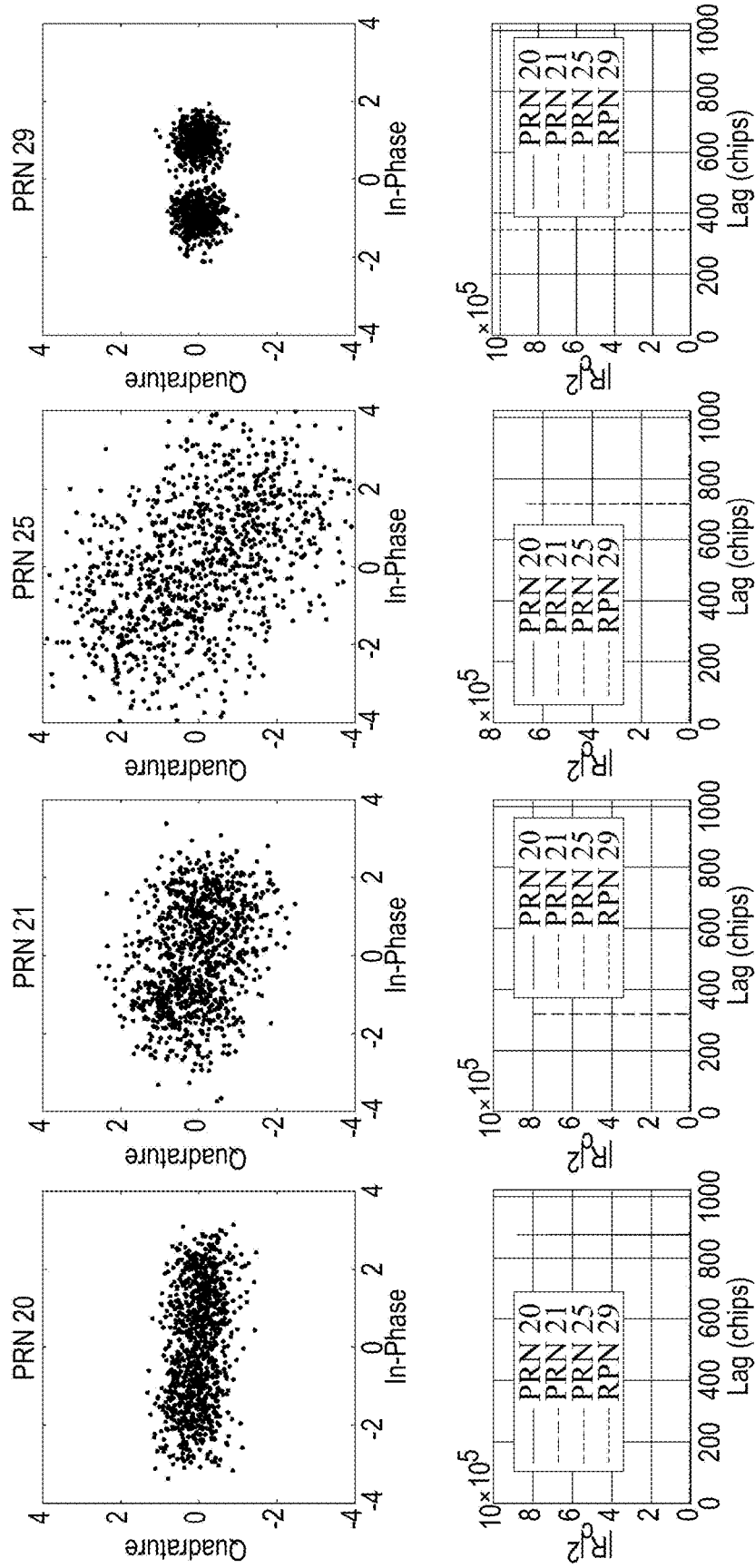
FIG. 7 illustrates correlation plots.

Once the Doppler frequencies are estimated, the residual carrier is wiped off from the received signal, compensated for delays due to Doppler, and coherently accumulated. The navigation bits are wiped off by correlating two successive frames to determine whether a transition occurred or not. The resulting accumulations are decimated (e.g., reduced to a sampling rate) to the chipping rate of GPS PRNs and processed by the beacon detection algorithm of the BON receiver. A scatter plot of accumulated signal before beacon signal detection is shown in FIG. 7 for the 4 satellites. The correlation function between the detected PRN and true PRNs of the 4 GPS satellites are shown in FIG. 7. The correlation plots in FIG. 7 demonstrate that the PRN of each of the 4 satellites was adequately estimated. Table I also shows the correct detected chips percentage of the detected beacon signals using the BON receiver.

TABLE I

THE PERCENTAGE OF CORRECTLY CHIPS IN THE DETECTED BEACONS USING BON RECEIVER

| | PRN number | | | |
|---|---|---|---|---|
| | PRN 20 | PRN 21 | PRN 25 | PRN 29 |
| Percentage of correctly detected Chips | 96% | 94% | 91% | 99.9% |

Deploying the Detected PRNs to Produce Navigation Observables

Figure 8:
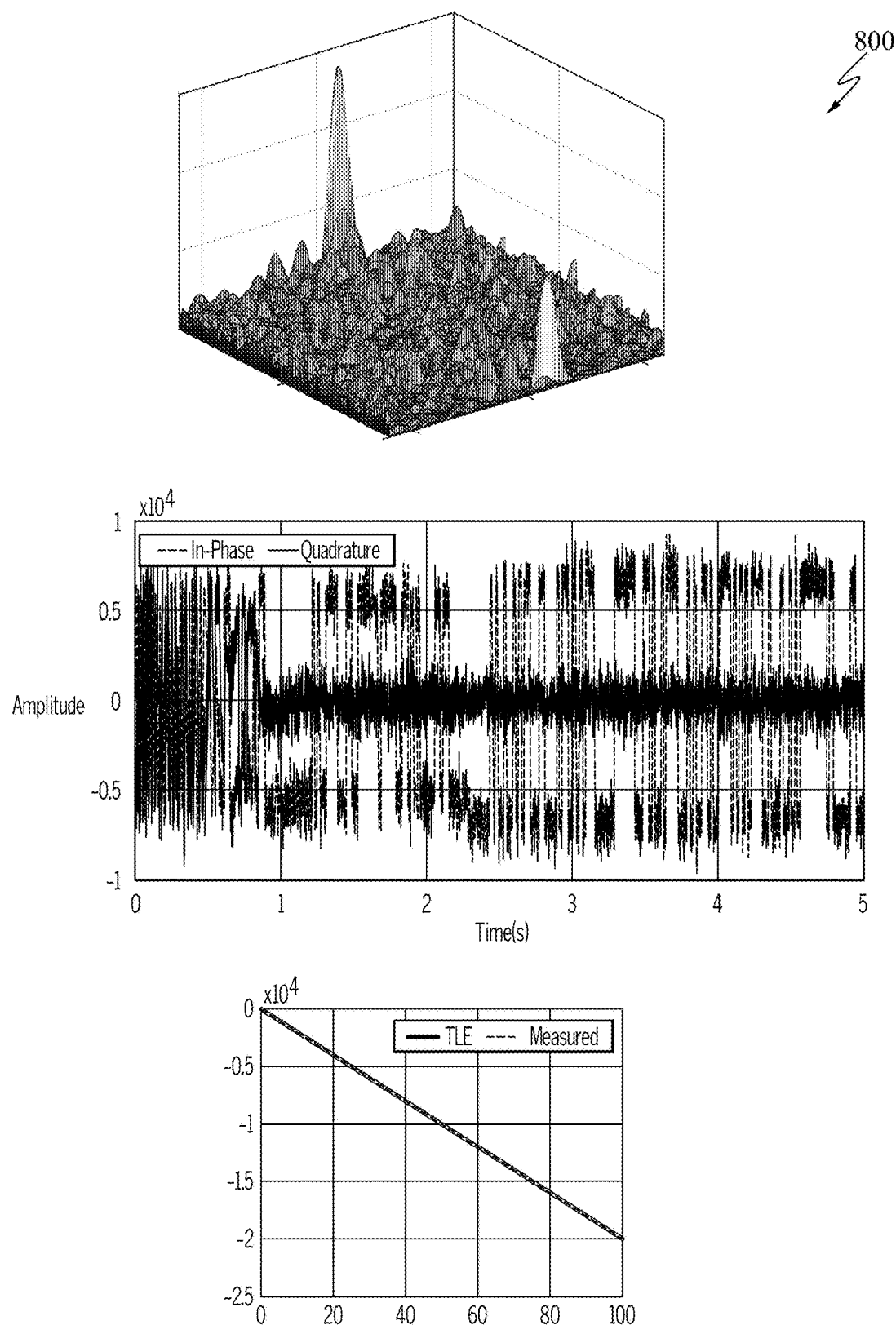
FIG. 8 illustrates tracking results.

The detected beacons are then used to produce pseudorange observables from the received GPS signals. The initial Doppler is known from the previous steps. The code phases are also known to be zero, since the detected beacon has the phase of the PRN at the time of initial reception. Therefore, signal acquisition is already performed; however, it is shown in FIG. 8 for illustration purposes. The initial Doppler and code phase estimates are used to initialize the tracking loops: a third-order phase-locked loop (PLL) with a carrier-aided delay-locked loop (DLL) with the dot product discriminator. The tracking results for PRN 21 are shown in FIG. 8 as 800 for a period of 5 seconds. Since GPS signals are treated as opportunistic signals in this paper, it is not assumed that the receiver can decode the navigation message. As a result the code phase estimate expressed in meters will be considered as the pseudorange estimate. The pseudorange estimate will provide positioning information of a device relative to a source of the signal of opportunity. A plurality of pseudorange estimates may be determined based on a plurality of sources of signals of opportunity.

C. Navigation Solution

In this section, a BON receiver is assumed stationary with the 3-D position vector rdr. It is also assumed that the receiver is equipped with an altimeter; hence, only the 2-D position of the receiver is estimated. The pseudorange from the ith satellite at time-step k can be modeled as $$\rho_i(k) = \|r_r - r_{si}(k)\|_2 + b_i + \epsilon_i,$$

where $r_{si}(k)$ is the 3-D position vector of the ith satellite at time-step k, $b_i$ is a bias term that captures the unknown bias between the receiver's and ith satellite's clocks, and $\epsilon i$ is the measurement error capturing ionospheric and tropospheric delays and measurement noise. The pseudorange measurements for all satellites at all time-steps are stacked in one measurement vector p and a batch nonlinear least-squares (NLS) estimator is implemented to solve for the $x \triangleq [r_r^T, b_1, \ldots, b_S]^T$ where S is the total number of visible satellites. The receiver's position in the NLS was initialized around 150 km from the true receiver positions, and all the biases $\{b_i\}_{i=1}^S$ were initialized with zeros. The resulting 2-D position with 4 satellites over a 110 second period was found to 54.4 meters. The experimental setup and results are shown in FIG. 9.

Embodiments above discuss a BON framework as a solution for exploiting SOPs with unknown signal specifications. Two main challenges of a BON were addressed. First, a chirp parameter estimation algorithm is proposed to estimate and track the Doppler frequencies of detected SOPs. Second, a blind detection algorithm was proposed to detect the beacon signals. We applied the BON receiver to decipher the GPS satellite signals. The experimental results show that the BON framework is capable of cognitively estimate the PRNs of GPS satellites with an average of 96% correct chip detection percentage.

Blind Doppler Estimation from LEO Satellite Signals

Figure 10:
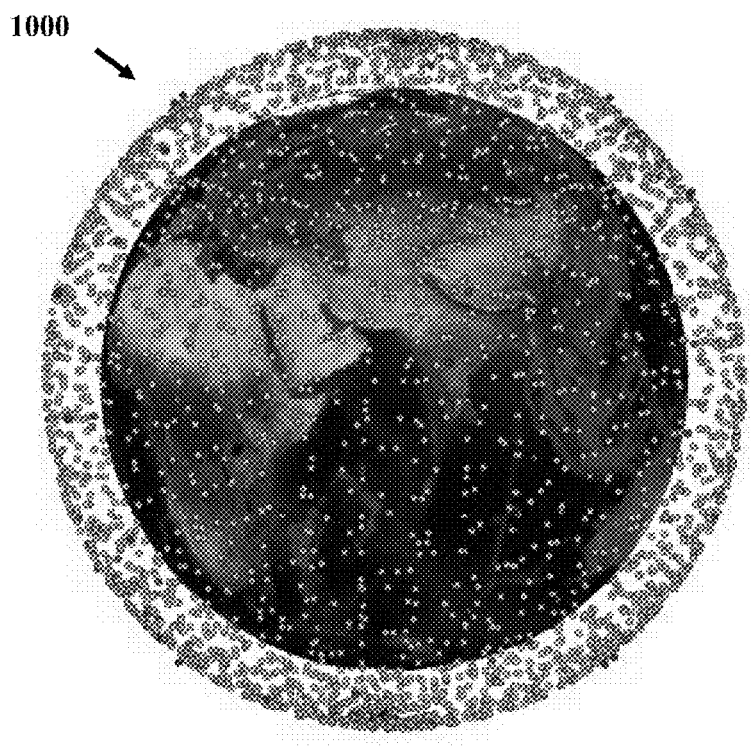
FIG. 10 depicts some of the existing and future broadband sources, such as LEO satellites.

FIG. 10 depicts some of the existing and future broadband sources 1000, such as LEO satellites, illustrated relative to Earth. LEO satellites possess desirable attributes for positioning in GNSS-challenged environments: 1) they are around twenty times closer to the Earth compared to GNSS satellites, which reside in medium Earth orbit (MEO), making their received signal power between 24 to 34 dBs higher than GNSS signals; 2) they will become abundant as thousands of broadband Internet satellites are expected to be deployed into LEO; and 3) each broadband provider will deploy broadband Internet satellites into unique constellations, transmitting at different frequency bands, making LEO satellite signals diverse in frequency and direction.

Moreover, the Keplerian elements parameterizing the orbits of these LEO satellites are made publicly available by the North American Aerospace Defense Command (NORAD) and are updated daily in the two-line element (TLE) files. Using TLEs and orbit determination algorithms (e.g., SGP 4), the positions and velocities of these satellites can be known, albeit not precisely. In addition, some of these broadband LEO satellites, such as Orbcomm satellites, are equipped with GPS receivers and broadcast their GPS solution to the terrestrial receivers. However, there are several challenges to overcome to navigate exclusively with LEO satellite signals, mainly the absence of: (1) publicly available receivers that can extract navigation observables from LEO satellite signals, (2) source of error characterization for designing LEO satellite navigation frameworks, and (3) performance analyses tools to evaluate these frameworks. Experimental results of a carrier phase differential LEO (CD-LEO) framework shows an unmanned aerial vehicle (UAV) navigating with signals from 2 Orbcomm LEO satellites over a 2-minute period with a position root mean-squared error (RMSE) of 15 m. However, the proposed frameworks so far rely on the knowledge of the structure of the signals transmitted by the Orbcomm satellites. There is still little information about the signal structure of future constellations that will bring thousands of satellites into LEO. Yet, one can be fairly certain that OFDM will be at the core of the transmission protocol of these broadband LEO satellites.

OFDM is already at the heart of the standards for 4G long-term evolution (LTE) and 5G new radio (NR) communication systems. Its multiple-input multiple-output (MIMO) capabilities allow higher data rates to be achieved compared to other multiplexing techniques. In addition to the high bandwidths, beamforming and spatial diversity have enabled high-rate reliable communication in such systems. Subsequently, it is safe to assume that OFDM will play an important role to the future of broadband LEO satellite communication. In OFDM systems, data symbols are mapped onto multiple carrier frequencies called subcarriers. The serial data symbols are first parallelized in groups. Then, each group is zero-padded to make the data vector length an even power of two, and an inverse fast Fourier transform (IFFT) is taken. The zero-padding provides a guard band in the frequency-domain. Finally, to protect the data from multipath effects, the last few symbols are repeated at the beginning of the data, which are called the cyclic prefix (CP). The transmitted symbols can be obtained at the receiver by executing these steps in reverse order. To do so, an OFDM receiver must first acquire symbol timing. That is why OFDM systems employ synchronization signals. For example, a primary and secondary synchronization sequence (PSS) and (SSS), respectively, are transmitted in LTE and NR systems for symbol timing recovery. Such sequences can be exploited for opportunistic navigation purposes. However, in such cases, it is assumed the receiver perfectly knows the synchronization sequences and can correlate local replicas of these sequences with the received signals. In the case where these sequences are unknown, as in the case of future broadband LEO satellite systems, acquiring and tracking of these satellite signals becomes impossible for a regular opportunistic receiver. As such, designing receivers that can blindly and adaptively estimate these sequences is a crucial need for the future of opportunistic navigation.

The problem of blind OFDM symbol timing recovery has been considered in the wireless communications and CR literature. The proposed approaches make assumptions that do not hold for the case of LEO satellite transmitters, mainly the low magnitude of the frequency offset and stationarity of the channel. Unfortunately, Doppler frequencies of 240 kHz or more could be observed for LEO satellites transmitting in the Ku band. Such frequencies are most likely greater than the subcarrier spacing of the transmitted OFDM symbols. As a result of the high dynamics of LEO satellites, it is almost impossible to coherently integrate the signal to accumulate enough power for reliably detecting the synchronization signals using conventional methods. While other approaches rely on large and expensive high gain antennas to accumulate enough power for a single snapshot, this work aims at developing a framework for low-cost, online estimation of synchronization sequences in OFDM signals.

Embodiments are directed to a computationally-efficient algorithm for blind Doppler estimation from OFDM signals. The resulting Doppler estimate will have an ambiguity. Second, embodiments are provided to resolve the ambiguity in the resulting Doppler estimate. Third experimental results demonstrate blind Doppler estimation from real 5G NR signals. Embodiments below are directed to a signal model, a blind Doppler estimation algorithm, and experimental results showing blind Doppler tracking of real 5G NR signals.

A main challenge facing the receiver is the partially known nature of the SOPs it aims to cognitively decipher, acquire, and track. Cognitive deciphering in the receiver refers to blindly detecting and tracking of the beacon signals, which in turn allows for exploiting received signals for positioning and navigation purposes. Beacon signal detection requires estimating a number of unknown parameters from the observations and the partially known information about the SOP. Given the scenarios discussed herein, it is reasonable to assume that only the bandwidth of the transmitted signal is known to the receiver. However, the Doppler frequency, the modulation type, and the length and symbols of the beacon signal are unknown. Modulation classification and unknown signal length estimation are widely investigated in the literature. It should be pointed out that, by definition, a beacon or pilot signal is a signal known by the receiver and is used for timing and carrier synchronization, e.g., the PN sequence in 3G cdma2000 systems or the CP, SSS, or PSS in 4G LTE and 5G NR systems. Correlation receivers are typically used to detect the presence of beacon or pilot signals and synchronize to them. Due to the properties of correlation receivers, the known beacon or pilot signals can still be detected reliably even at relatively low signal-to-noise ratios (SNRs). However, the beacon is unknown to the receiver and the signal's SNR is typically too low for reliable blind detection. Consequently, coherent integration becomes crucial to increase the effective SNR of the received beacon signal. To be able to coherently integrate successive transmissions of the beacon signal, the Doppler shift (or Doppler frequency) must be estimated. Embodiments are directed to blind frequency recovery of OFDM signals transmitted by LEO satellites.

Receiver Baseband Signal Model

It can be shown that the transmitted OFDM signal can be written as $$x(t) = \sum_{i=1}^{N_c-1} A_i \cos[(W_i + w_x)t + \phi_i],$$

where $\omega_c$ is the carrier angular frequency, $N_c$ is the total number of subcarriers, and $A_i, \omega_i,$ and $\varphi_i$ are the amplitude, angular frequency, and phase of the ith subcarrier. Due to the relative motion between the receiver and the LEO space vehicle (SV), a Doppler frequency fD will be induced. Define $$\xi \triangleq \frac{f_D}{f_c},$$

as the fractional Doppler frequency, where fc is the carrier frequency. The effect of fD on the transmitted signal is given by $$x'(t) = \sum_{i=1}^{N_c-1} A_i \cos[(1+\xi)(w_i + w_x)t + \phi_i].$$

It can be seen from that the Doppler frequency not only shifts the subcarriers but stretches the spacing between them as well. At the receiver, after mixing to baseband and assuming an additive white Gaussian noise (AWGN) channel with noise power spectrum $N_0$, tt can be shown that the received OFDM signal can be written as $$y(t) = \sum_{i=1}^{N_c-1} A_i \cos[(1+\xi)\omega_i t + \xi\omega_c t + \phi_i] + n(t),$$

$$y(t) = \sum_{i=1}^{N_c-1} A_i \cos[(1+\xi)w_i t + \xi w_c t + \phi_i] + n(t),$$

where n (t) is the zero-mean channel noise.

Blind Doppler Estimation for OFDM Signals from Leo Signals

One or more embodiments are directed to a blind Doppler estimation framework. In what follows, the receiver is assumed stationary.

Figure 11A:
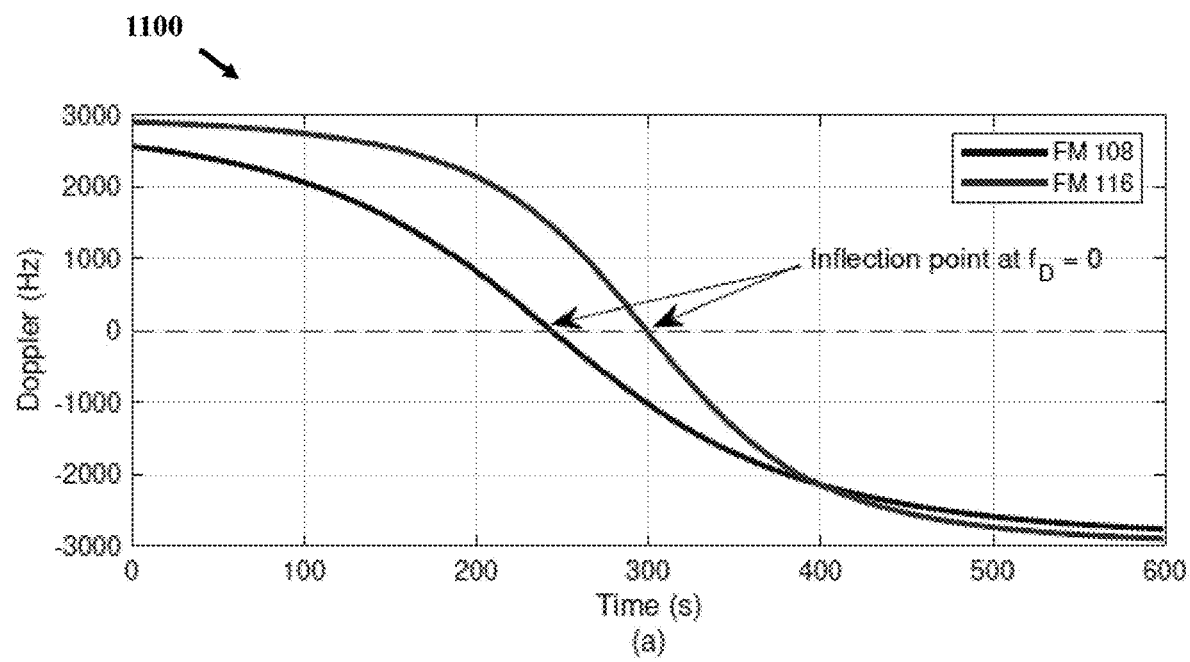
FIGS. 11A-11B illustrate predicted Doppler values and Doppler residuals.
Figure 11B:
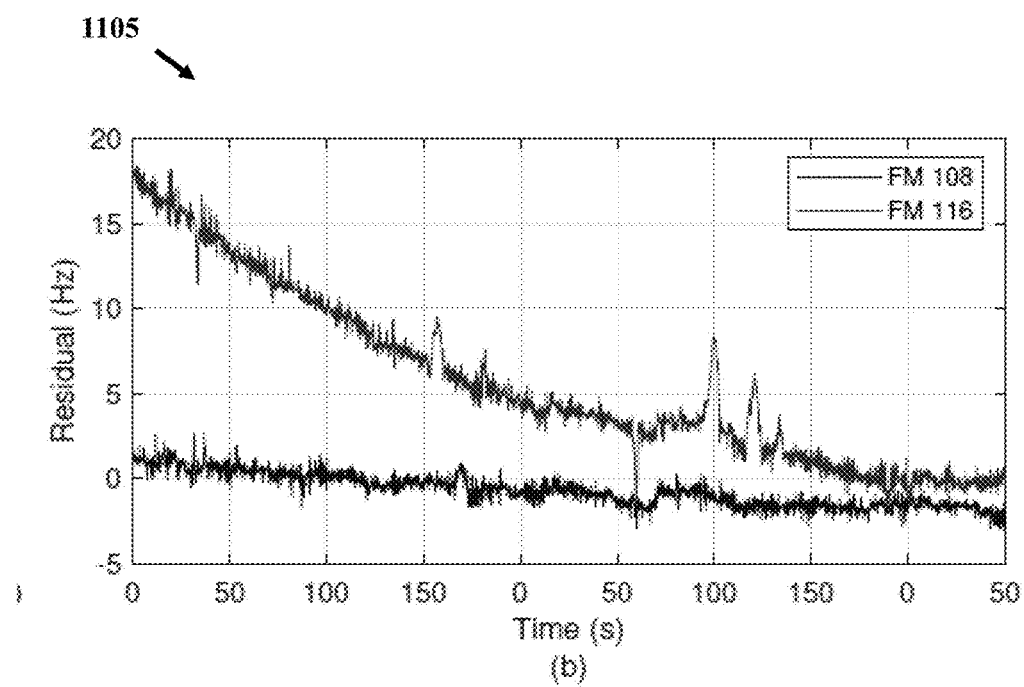

Initial Doppler Wipe-Off—the Doppler frequency observed from two Orbcomm LEO SVs is significantly large and must be accounted for. Itis assumed the receiver has a prior on its position. This prior can be off by kilometers. Since TLE files are available for free, one can predict the Doppler using TLE and orbit determination software, e.g., SGP4, and the prior on the receiver position. FIG. 11A shows (a) the predicted Doppler of two Orbcomm LEO SVs using TLE and SGP4 software as 1100. Denote $\hat{f}_D$ the predicted Doppler from TLE. The wipe-off operation on x(t) can be expressed as (after low-pass filtering)

$$\hat{y}(t) \triangleq y(t)\cos(2\pi \hat{f}_D t) \approx \sum_{i=1}^{N_c-1} A_i \cos[(1+\xi)w_i t + \tilde{\xi} w_c t + \phi_i] + \hat{n}(t),$$

where $$\xi \triangleq \frac{\tilde{f}_D}{f_c}, \quad \tilde{f}_D \triangleq f_D - \hat{f}_D,$$

and nˆ(t) is the noise after wipe-off and filtering. However, the predicted Doppler will have errors due to ephemeris errors in the TLE, the initial error in the receiver position, and propagation errors. Subsequently, $\tilde{f}_D$ must be estimated. FIG. 11B shows Doppler residuals 1105 after wipe-off for 2 Orbcomm LEO SVs using the Dopppler predicted from TLE. The true Doppler was measured using a receiver.

Blind Residual Doppler Estimation

The blind Doppler estimator in the receiver processes one integration period at a time, known as coherent processing interval (CPI), to estimate the Doppler for that particular CPI. Denoting the length of the kth CPI by I, one can form the vector of samples of the discretized wiped-off signal y (t) as $$\tilde{y}^k \triangleq [\tilde{y}[kI], \tilde{y}[kI+1], \ldots, \tilde{y}[(k+1)I-1]]^T$$

Figure 12A:
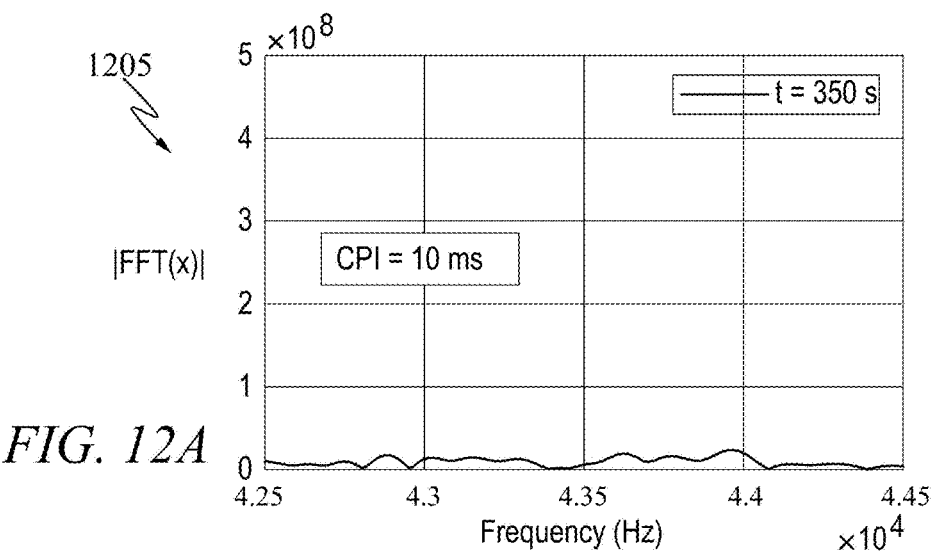
FIG. 12 illustrates peak tracking.
Figure 12B:
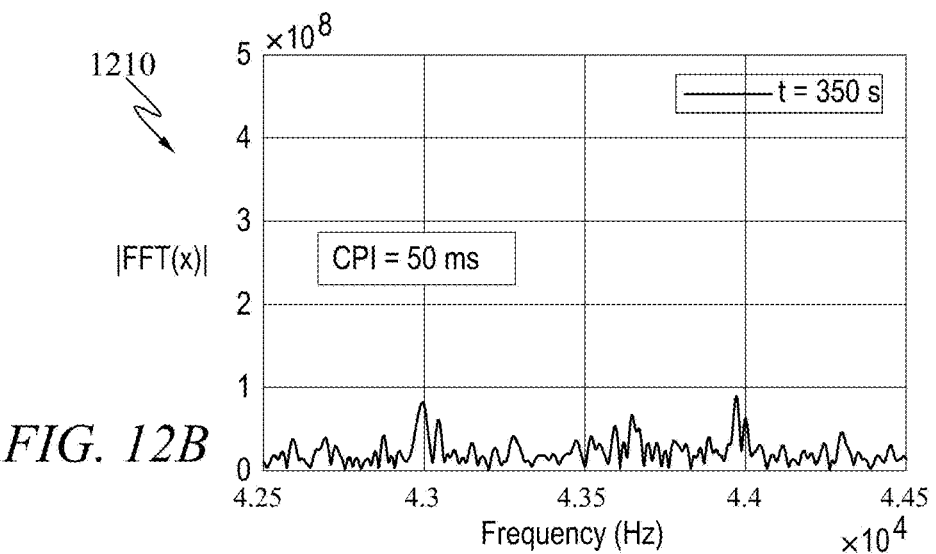
Figure 12C:
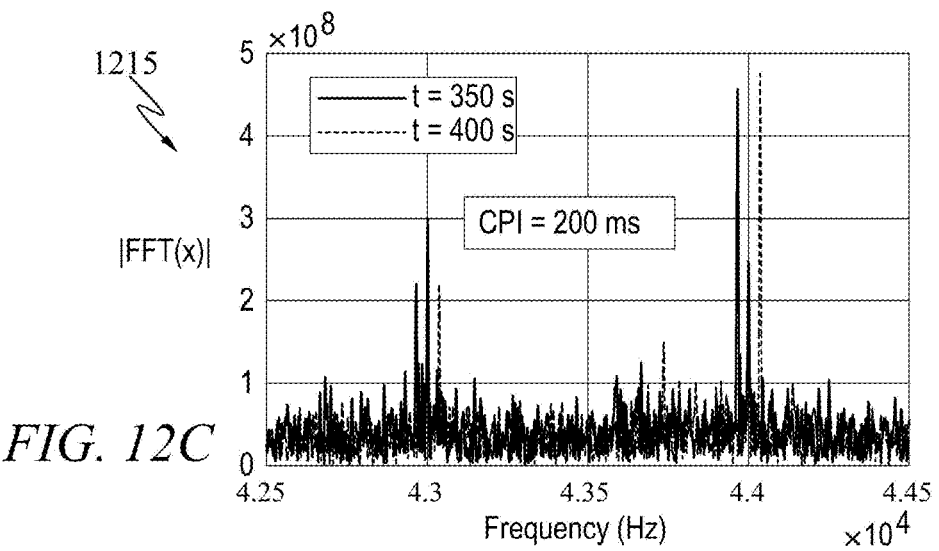

To accumulate enough energy, I has to be large enough to include a sufficient number of complete cycles of beacon and synchronization signals. The periodicity of such signals in the data will show up as an impulse in the frequency domain. For systems that operate at a low SNR regime, I should be chosen be large enough to accumulate energy and compensate for the low SNR. It can be seen from FIG. 11B that the residual Doppler is small enough to consider it constant in reasonably long CPIs. Therefore, $f_D[n]=f_{D_k}$ in the kth CPI. As mentioned earlier, the Fourier transform of the signal part of the observations including a periodic beacon of length L can be written as an impulse train with period $$f_0 = \frac{F_s}{L},$$

where Fs is the sampling frequency. More precisely, written as an impulse train with period $$\mathcal{F}\left\{\sum_{i=-\infty}^{\infty} \exp(j2\pi \tilde{f}_{D_k} nT_s) s[n-iL]\right\} = \sum_{i=-\infty}^{\infty} S(if_0) \delta s(f - \tilde{f}_{D_k} - if_0),$$

where S(f)=F{s(t)} is the Fourier transform of the beacon signal s(t) and Ts=1/Fs is the sampling time. As such, a proper sliding band-pass filter, is capable of tracking the Doppler frequency changes in different CPIs. The choice of which peak to track is done manually in this paper. However, it has to be as close as possible to the DC component in order to minimize the effect of the Doppler shift on higher subcarriers. As such, the effect of the subcarriers on the residual Doppler estimate is negligible. To see the effect of CPI, 5G data was collected and processed for different values of I. The experimental setup is described below. The signals were collected from a moving car so the Doppler was time-varying. FIG. 12 shows how the impulse train become visible once the CPI is increased. Moreover, FIG. 12 shows that the FFT peaks can be tracked over time.

FIG. 12 illustrates (a) FFT of the wiped-off signal for a 10 ms CPI at't=350 s. as 1205 (b) FFT of the wiped-off signal for a 50 ms CPI at t=350 s . . . as 1210 (c) FFT of the wiped-off signal for a 200 ms CPI at t=350 s and t=400 s. as 1215.

Denote $fD$ as the estimated residual Doppler. Tracking the impulse trains of the periodic signals results in ambiguity that is an integer multiple of f0 in the residual Doppler estimate. Both f0 and the integer ambiguity m are unknown to the receiver. The total Doppler estimate can hence be formed as $$fD_{amb} \triangleq f_D + f_D = f_D + mf_0 + \epsilon f_D,$$

where $\epsilon f_D$ is the estimation error. A method for resolving $mf_0$ is proposed next.

Doppler Ambiguity Resolution

As shown in FIG. 12 (section (a)), the Doppler profile of a LEO SV and a stationary receiver will have an inflection point at $f_D=0$. Subsequently, the inflection point is calculated from the time history of $fD_{amb}$ using polynomial curve fitting around the inflection point. Denote $f\ D_{amb}\ 0$ the Doppler frequency at the inflection point. Subsequently, a final Doppler estimate is formed according to $$fD \triangleq fD_{amb} - fD_{amb}, 0.$$

To demonstrate the proposed Doppler estimation framework, 5G NR signals were collected on a moving vehicle to mimic residual Doppler after wiping-off the residual carrier of the received signal using the Doppler estimated from TLEs.

Experimental Setup

Figure 13:
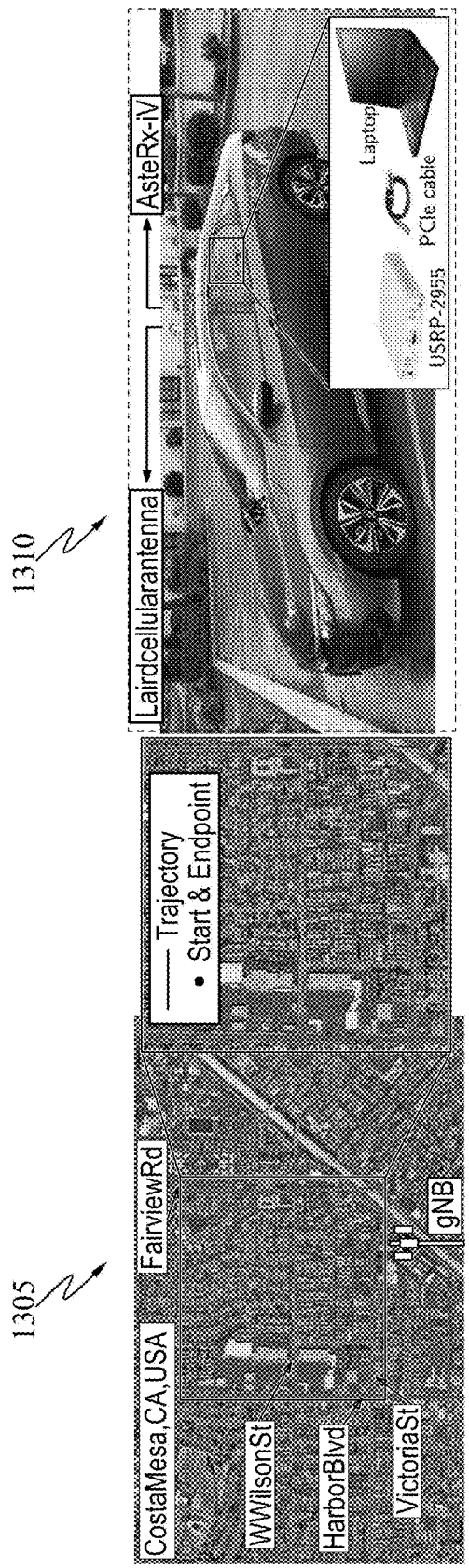
FIG. 13 illustrates an experimental setup.

An experimental setup is shown in FIG. 13 for an experiment was performed in Costa Mesa, CA, USA shown as 1305. A National Instrument (NI) universal software radio peripheral (USRP)-2955 with a tri-band Laird cellular antenna were equipped on a moving ground vehicle to sample 5G NR signals at a sampling rate of 10 MSps. The sampled data were stored for post-processing. Experimentla hardware is shown as 1310. The receiver was listening to one 5G gNB, whose position was mapped prior to the experiment. The vehicle was equipped with a Septentrio AsteRx-i V integrated GNSS-inertial measurement unit (IMU) to provide a ground truth for position and velocity of the vehicle. The AsteRx-i V is equipped with a dual-antenna multi-frequency GNSS receiver and a VectorNav VN-100 micro-electromechanical system (MEMS) IMU. The ground truth obtained from the GNSS-IMU system, along with the known gNB position, was used to calculate the expected Doppler frequency.

Figure 14:
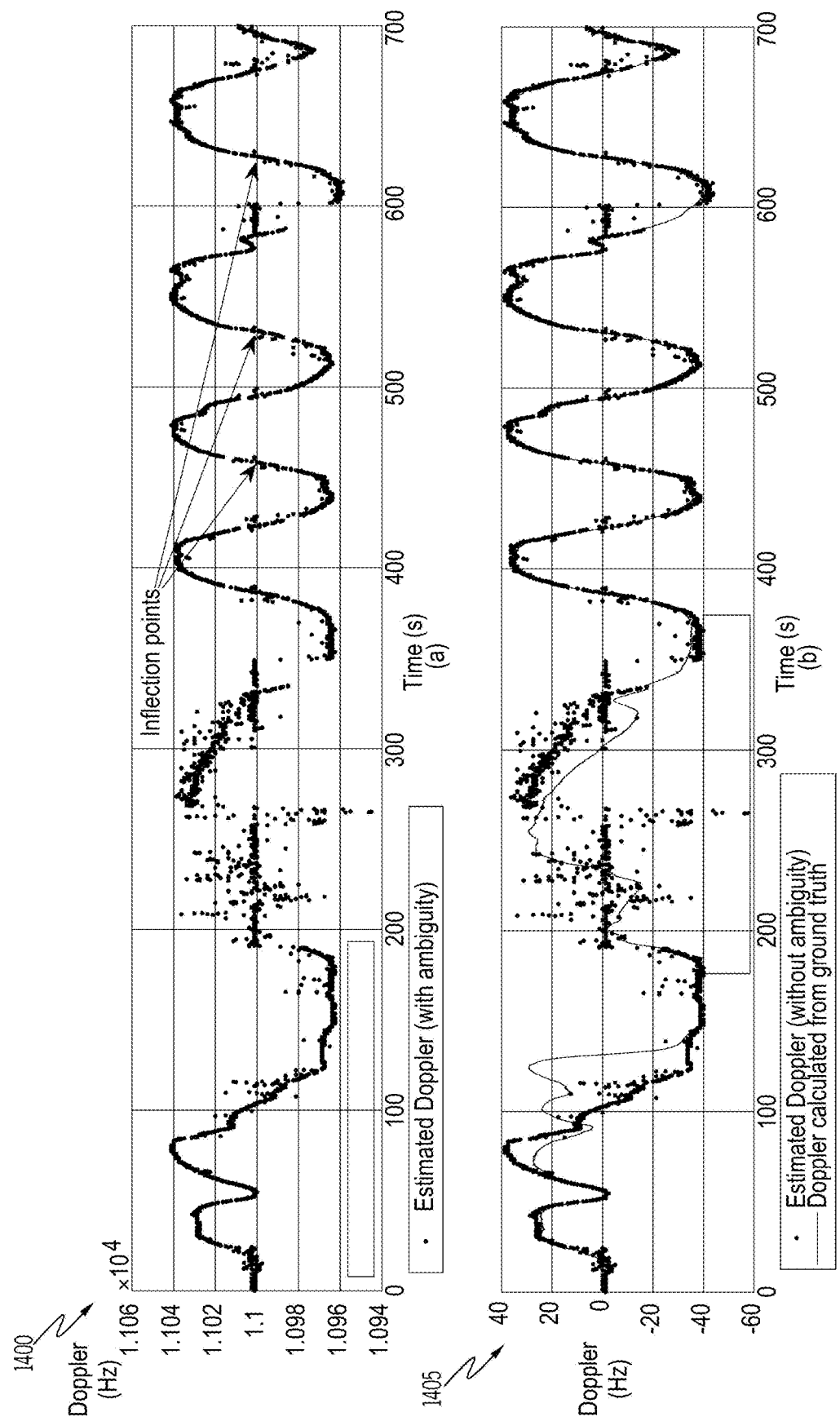
FIG. 14 illustrates estimated Doppler frequencies.

The USRP sampled 5G signals over a period of about 700 seconds at a carrier frequency of 872 MHz. The proposed framework was used to track the Doppler throughout the trajectory. The estimated Doppler with ambiguity is shown in FIG. 14 section (a). The Doppler ambiguity was calculated to be 11.0025 kHz, and was subtracted from the estimated Doppler. The Doppler estimate without the ambiguity and the predicted Doppler from ground truth are shown in FIG. 15 section (b). The root mean-squared error (RMSE) between the final estimated Doppler and the predicted Doppler was calculated to be 14.5 Hz over the entire trajectory, and 6.45 Hz over the second half of the trajectory. FIG. 14 section (a) illustrates an Estimated Doppler frequency with ambiguity as 1400 and section (b) illustrates Estimated Doppler frequency without ambiguity and predicted Doppler frequency from ground truth as 1405.

Embodiments are directed to blind Doppler estimation from OFDM signals transmitted by LEO satellites. The proposed framework first uses the TLE to predict the Doppler and performs initial wipe-off with the latter. Next, a blind Doppler tracking algorithm was discussed to track the residual Doppler. It was shown that the resulting Doppler estimate has a constant ambiguity, and a method for resolving this ambiguity was proposed. Experimental results are presented showing the proposed receiver tracking real 5G NR signals from a moving ground vehicle over a period of 700 seconds with a 14.5 Hz RMSE for the entire trajectory, and 6.45 Hz RMSE for the second half of the trajectory.

While this disclosure has been particularly shown and described with references to exemplary embodiments thereof, it will be understood by those skilled in the art that various changes in form and details may be made therein without departing from the scope of the claimed embodiments.

What is claimed is:

1. A method for blind opportunistic navigation, the method comprising:

receiving, by a device, at least one signal of opportunity;

performing, by the device, at least one operation to estimate a Doppler frequency of the at least one signal;

performing, by the device, at least one operation for coherent integration of the at least one signal using the estimate of Doppler frequency, wherein coherent integration estimates at least one beacon sequence of the at least one signal;

detecting, by the device, at least one symbol of a beacon sequence of the at least one signal; and controlling, by the device, navigation using the at least one beacon sequence.

2. The method of claim 1, wherein receiving at least one signal of opportunity includes receiving multiple signals in a bandwidth of interest, and wherein the at least one signal includes a synchronization beacon for receiver timing and carrier recovery.

3. The method of claim 1, wherein estimating Doppler frequency includes performing one or more operations to detect joint signal activity and to classify modulation of the at least one signal, wipe-off the data symbols from the at least one signal, and to determine a frequency of the at least one signal.

4. The method of claim 1, wherein estimating Doppler frequency includes tracking Doppler frequency of a plurality of signals of opportunity and detecting symbols of a beacon sequence for the plurality of signals of opportunity.

5. The method of claim 1, wherein Doppler frequency, modulation type, and length and symbols of a beacon signal of the at least one signal are unknown to the device, and wherein coherent integration includes integrating successive transmissions of a beacon signal using estimates of Doppler frequency and code phase to track the at least one signal of opportunity.

6. The method of claim 1, wherein coherent integration is performed to detect symbols of a beacon sequence of the at least one signal of opportunity, including determining presence of a beacon signal and tracking Doppler frequency of multiple signals of opportunity to determine the beacon sequence.

7. The method of claim 1, wherein coherent integration is performed for a number of complete cycles of beacon and synchronization signals to accumulate energy and to compensate for the low signal to noise ratios.

8. The method of claim 1, wherein detecting at least one symbol of a beacon sequence by correlating successive frames to determine occurrence of a transition, sampled using a chirp rare and processing accumulated frames using a tree based algorithm.

9. The method of claim 1, wherein controlling navigation includes determining a code phase estimate in meters as a pseudorange estimate of device position.

10. The method of claim 1, wherein controlling navigation includes stacking measurement vectors for sources of the at least one signal of opportunity to determine position of the device relative to source of the signal of opportunity.

11. A device configured for blind opportunistic navigation, the device comprising:

a receiver configured to receive at least one signal of opportunity; and a controller configured to perform at least one operation to estimate a Doppler frequency of the at least one signal;

perform at least one operation for coherent integration of the at least one signal using the estimate of Doppler frequency, wherein coherent integration estimates at least one beacon sequence of the at least one signal;

detect at least one symbol of a beacon sequence of the at least one signal; and control navigation using the at least one beacon sequence.

12. The device of claim 11, wherein receiving at least one signal of opportunity includes receiving multiple signals in a bandwidth of interest, and wherein the at least one signal includes a synchronization beacon for receiver timing and carrier recovery.

13. The device of claim 11, wherein estimating Doppler frequency includes performing one or more operations to detect joint signal activity and to classify modulation of the at least one signal, wipe-off the data symbols from the at least one signal, and to determine a frequency of the at least one signal.

14. The device of claim 11, wherein estimating Doppler frequency includes tracking Doppler frequency of a plurality of signals of opportunity and detecting symbols of a beacon sequence for the plurality of signals of opportunity.

15. The device of claim 11, wherein Doppler frequency, modulation type, and length and symbols of a beacon signal of the at least one signal are unknown to the device, and wherein coherent integration includes integrating successive transmissions of a beacon signal using estimates of Doppler frequency and code phase to track the at least one signal of opportunity.

16. The device of claim 11, wherein coherent integration is performed to detect symbols of a beacon sequence of the at least one signal of opportunity, including determining presence of a beacon signal and tracking Doppler frequency of multiple signals of opportunity to determine the beacon sequence.

17. The device of claim 11, wherein coherent integration is performed for a number of complete cycles of beacon and synchronization signals to accumulate energy and to compensate for the low signal to noise ratios.

18. The device of claim 11, wherein detecting at least one symbol of a beacon sequence by correlating successive frames to determine occurrence of a transition, sampled using a chirp rare and processing accumulated frames using a tree based algorithm.

19. The device of claim 11, wherein controlling navigation includes determining a code phase estimate in meters as a pseudorange estimate of device position.

20. The device of claim 11, wherein controlling navigation includes stacking measurement vectors for sources of the at least one signal of opportunity to determine position of the device relative to source of the signal of opportunity.

* * * * *